No. 731,379. PATENTED JUNE 16, 1903.
C. W. MARTIN.
PIPE OR HOSE COUPLING.
APPLICATION FILED MAY 4, 1900.
NO MODEL.
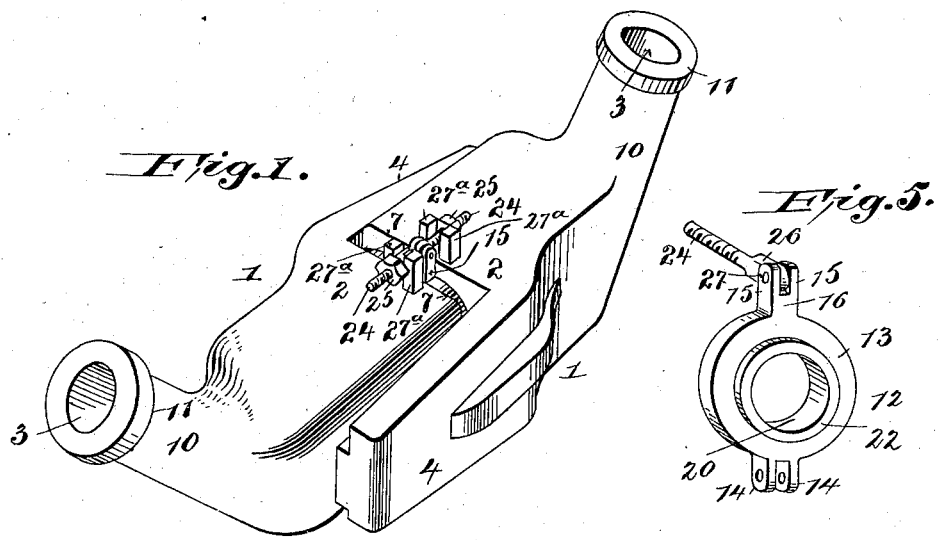
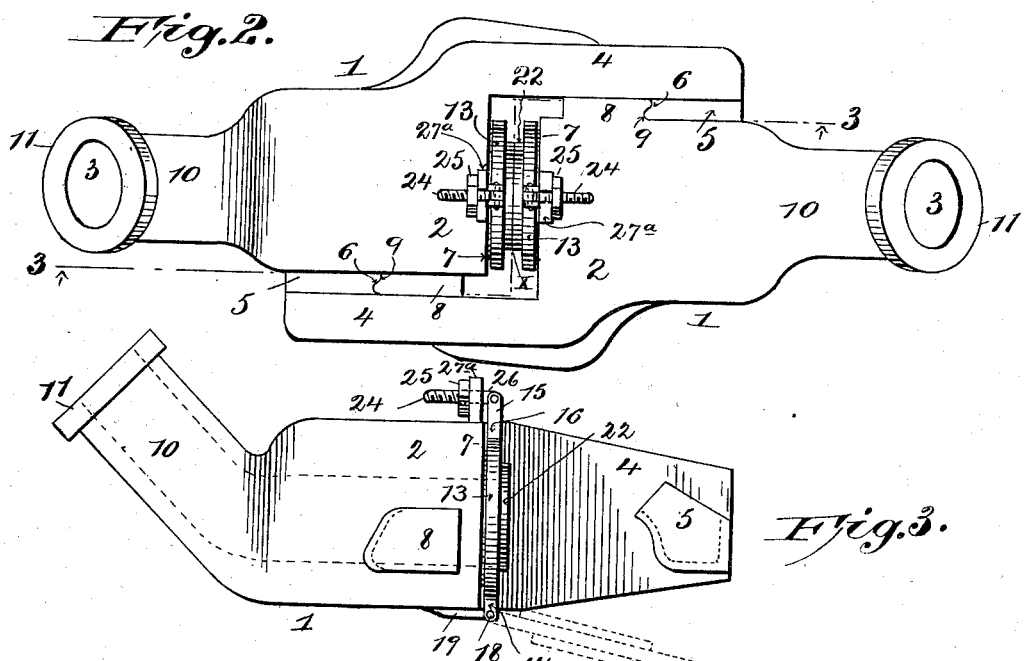
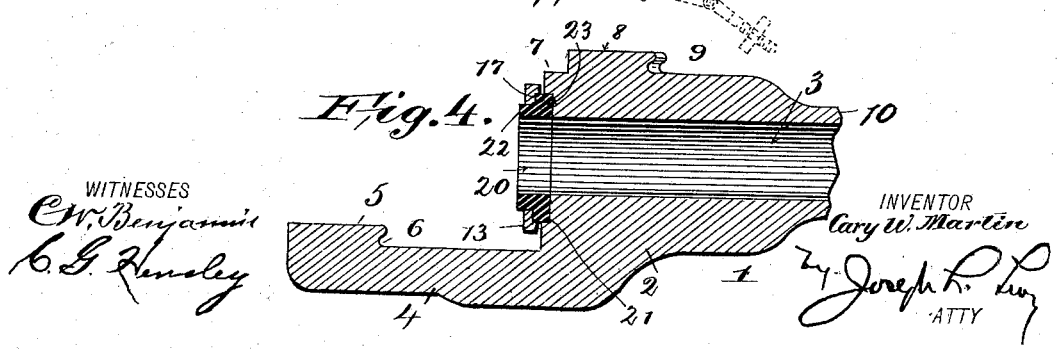
WITNESSES
INVENTOR
Cary W. Martin
ATTY No. 731,379.

Patented June 16, 1903.

UNITED STATES PATENT OFFICE.

CARY W. MARTIN, OF NEW YORK, N. Y.

PIPE OR HOSE COUPLING.

SPECIFICATION forming part of Letters Patent No. 731,379, dated June 16, 1903.

Application filed May 4, 1900. Serial No. 15,497. (No model.)

*To all whom it may concern:*

Be it known that I, CARY W. MARTIN, a citizen of the United States, residing at the city of New York, borough of Manhattan, county and State of New York, have invented certain new and useful Improvements in Pipe or Hose Couplings, of which the following is a specification.

The object of my invention is to provide a simple and efficient device for coupling together the ends of two sections of pipe, which improvements are more particularly designed for employment on the cars of railway-trains for connecting the ends of the sections of air, gas, or steam pipes under or on two adjacent cars of a train, by means of which coupling can be readily effected, a tight joint maintained between the coupling-sections, and the packing devices on each individual coupler more readily handled for adjustment or replacement.

My invention therefore resides in the improved construction and combination of parts hereinafter described.

In the drawings forming part of this specification, Figure 1 is a perspective view embodying my improvements, showing two coupling-heads united. Fig. 2 is a plan view thereof. Fig. 3 is a side elevation, the swing of the gasket-carrying frame being indicated in dotted lines. Fig. 4 is a longitudinal sectional elevation substantially on the line 3 3, Fig. 2. Fig. 5 is a perspective view showing the gasket-frame detached.

As my invention resides in the means for supporting the packing-ring or gasket and means for seating it against the coupling-head, together with certain details of construction hereinafter pointed out, it is not essential that this particular form of coupling-head be employed, as it will be apparent that my improvements can be varied in accordance with their varied conditions of employment.

I shall describe my improvements as applied to a single coupler, it being understood that the other coupler is to be constructed in the same manner.

In the embodiment of my invention as illustrated herein 1 is the coupler, having an enlarged head 2, provided with a longitudinal bore 3, connected with the train-pipe (not shown) and having an outwardly-extending arm 4, provided at its end with the coupling-lug 5, provided with the locking-groove 6, the head having a shoulder or abutment 7, through which the bore 3 passes, and at the rear of the abutment, on the side opposite the arm 4, is formed another coupling-lug 8, with its locking-groove 9. Both of these lugs are formed as shown in plan in Fig. 2 and form when united with the companion parts on another coupler a so-called "gravity" engagement. At 10 is the shank of the head, which extends at an angle therefrom and upwardly, the head being disposed in use so as to bring the coupling-lugs at the side or perpendicularly disposed, the shank having a flange 11 for attachment to the train-pipe.

The means for supporting the gasket or packing-ring and for seating the gasket in the coupling-head will now be described.

At 12, Fig. 5, is the gasket-frame, comprising an annular ring 13, having ears 14 15 diametrically located on the periphery of the ring and extending outwardly in opposite directions, the ears 15 being formed at the end of a lug 16, while the inner side of the ring is formed with an annular depression or seat 17, Fig. 4, the ears 14 being provided with holes through which passes a pivoting-pin 18, which latter likewise passes through a lug 19 on the head 1. The gasket-frame is thus mounted to swing in a vertical arc on a pivot horizontally located where the couplings are attached to the train-pipe in position for use, which frame is also adapted to swing down entirely free from the coupling-head, as indicated in dotted lines, Fig. 3.

At 20 is a gasket or packing-ring provided with a bore alining with the bore 3 when the parts are in position, as shown in Fig. 4. The gasket has an outwardly-extending annular flange 21 and a projecting shoulder 22, the latter being a sealing-point for the companion couplings when locked together, as indicated at $x$ in Fig. 2. The gaskets or packing-rings may be of rubber or any other desired material, and the rear of the gasket and its annular flange are seated in an annular recess 23, formed in the abutment 7. The gasket is normally carried by the ring 13, as clearly indicated in Figs. 4 and 5, the front face of the annular flange 21 being seated in the annular recess 17, formed in the rear face of the ring, while the projecting shoulder 22 extends outwardly from the face of the ring, as shown in Figs. 4 and 5. The parts are so adjusted that when the frame is thrown upwardly toward the head the annular flange 21 will be seated immediately in the abutment 7, thereby avoiding the use of glands, packing-nuts, and other uncertain and complicated devices for compressing the packing. For securing the frame in a vertical position relative to the head 1 and for firmly seating the gasket against the head I employ an arm pivoted to the frame and a lock-nut adapted to bear against the projection on the head; but although I prefer this form of attaching device I do not limit myself to the same, which is constructed as follows: At 24 is an arm or bolt provided at its free end with an exterior thread adapted to carry a nut 25, the head 26 of the bolt receiving a pivoting-pin 27, which passes through the ears 15, thus pivoting the bolt onto the frame 12, and extending upwardly from the head 2 are the lugs 27ª, spread apart, which receive the bolt 24 between them, the nut 25 bearing against the rear of the lugs 27ª, as indicated in Figs. 1, 2, and 3. By this construction the frame and the gasket carried thereby can be placed and secured in position and the proper pressure brought to bear upon the annular shoulder 23 of the gasket through the pressure of the ring 13 against it to firmly seat the gasket in the head and also seat the ring upon the gasket.

To renew the gasket, it is only necessary to unlock the bolt 24, swing the frame downwardly, remove the gasket, and replace it with a new one.

It will be noted by reference to the figures that the pivot for the frame is located below the bore 3 and the locking means located above the bore, both substantially vertical in line with each other when the coupling is secured to the train-pipe, as before described, and also that the locking means for the frame, which includes means for adjusting the pressure of the gasket upon the head, are exterior to the coupling, so that they can be got at without detaching the couplings.

Having described my invention, I claim—

1. In a two-part hose-coupling composed of like halves or portions, a bored coupling-head; an arm extending outwardly from said head; a coupling-lug on said arm provided with a locking-groove; a coupling-lug provided with a locking-groove arranged on the side of said coupling-head opposite said arm, with a frame hinged to said head and a packing means carried by said frame, substantially as described.

2. The combination with the coupling-head, the frame secured to said head so as to swing to or from the same, packing means carried by said frame, and means carried in part by the said frame and by the head for locking the frame against the head and adjusting the pressure of the packing against the head.

3. In a hose-coupling having a head, the combination with the ring carrying the gasket, a pivot for the ring upon the head, a bolt pivotally secured to the ring diametrically of the first-mentioned pivot, and means for securing the bolt upon the head.

4. The combination with the head 2 of the ring 13 having the ears 14, the lug 19 on the head, the pivoting-pin 18 passing through the lug and ears, packing means, carried by said ring, and means for locking the ring to the head located on the periphery of the ring diametrically to the first-mentioned pivot.

5. The combination with the head 2 of the ring 13 pivoted to said head, packing means carried by said ring, the bolt pivoted to the ring and extending therefrom diametrically to the first-mentioned pivot, the spaced lugs extending upwardly from the head, and adapted to receive the bolt, and a nut on the bolt adapted to bear against said lugs.

6. The combination with the head 2, having an annular seat 23 about its bore 3, the gasket having a flange 21 and projecting shoulder 22, the ring 13 having an annular seat 17, the shoulder 22 extending through the ring, means for pivoting the ring upon the head compressing the ring upon the said flange and the flange into the recess 23.

Signed in the city, county, and State of New York this 23d day of April, 1900.

CARY W. MARTIN.

Witnesses:
ADOLPHUS A. JACKSON,
CHAS. G. HENSLEY.